(12) United States Patent
Friggstad

(10) Patent No.: US 7,484,748 B2
(45) Date of Patent: Feb. 3, 2009

(54) SLOW RESPONSE STEERING CONNECTION ASSEMBLY

(75) Inventor: Terry A. Friggstad, Grasswood (CA)

(73) Assignee: CNH Canada, Ltd. (CA)

( * ) Notice: Subject to any disclaimer, the term of this patent is extended or adjusted under 35 U.S.C. 154(b) by 495 days.

(21) Appl. No.: 11/222,100

(22) Filed: Sep. 8, 2005

(65) Prior Publication Data

US 2007/0052203 A1    Mar. 8, 2007

(51) Int. Cl.
*B60D 53/00* (2006.01)
(52) U.S. Cl. .................. 280/408; 280/411.1; 280/444
(58) Field of Classification Search .............. 280/476.1, 280/411.1, 412, 408, 444
See application file for complete search history.

(56) References Cited

U.S. PATENT DOCUMENTS

| 1,658,203 | A |   | 2/1928  | Karlsson |
|-----------|---|---|---------|----------|
| 2,210,007 | A |   | 8/1940  | Rodin |
| 2,823,929 | A |   | 2/1958  | Pasquali |
| 2,974,978 | A |   | 3/1961  | Isachsen |
| 3,229,986 | A |   | 1/1966  | Ferris |
| 3,292,948 | A | * | 12/1966 | McMasters et al. .......... 280/412 |
| 3,724,874 | A | * | 4/1973  | Simpson ...................... 280/408 |
| 4,002,352 | A | * | 1/1977  | Hager ......................... 280/408 |
| 4,295,659 | A |   | 10/1981 | Mergen |
| 4,382,607 | A |   | 5/1983  | Voight |
| 4,723,787 | A | * | 2/1988  | Hadley et al. ............... 172/311 |
| 5,700,023 | A | * | 12/1997 | Picard ......................... 280/426 |
| 6,135,484 | A |   | 10/2000 | Lauronen et al. |

FOREIGN PATENT DOCUMENTS

EP        0350008 A2    7/1989

* cited by examiner

*Primary Examiner*—Tony H. Winner
(74) *Attorney, Agent, or Firm*—Rebecca Henkel

(57) ABSTRACT

A steering connection assembly for a vehicle train having at least one implement towed behind a tow vehicle in a direction of travel is provided. The steering connection assembly includes an elongated tow bar interconnecting a first implement towed behind a second implement. A rearward end of the tow bar is includes an elongated opening to receive a steering rod member therethrough. A steering arm interconnects the steering rod member to a caster-type wheel assembly located at a forward of a first towed implement. With a first angle of rotation of the tow bar relative the longitudinal axis of the first implement, the vertical steering rod member slides along the opening of the tow bar such that the steering arm member and attached wheel assembly rotate a second angle of rotation less than the first angle of rotation of the tow bar.

16 Claims, 5 Drawing Sheets

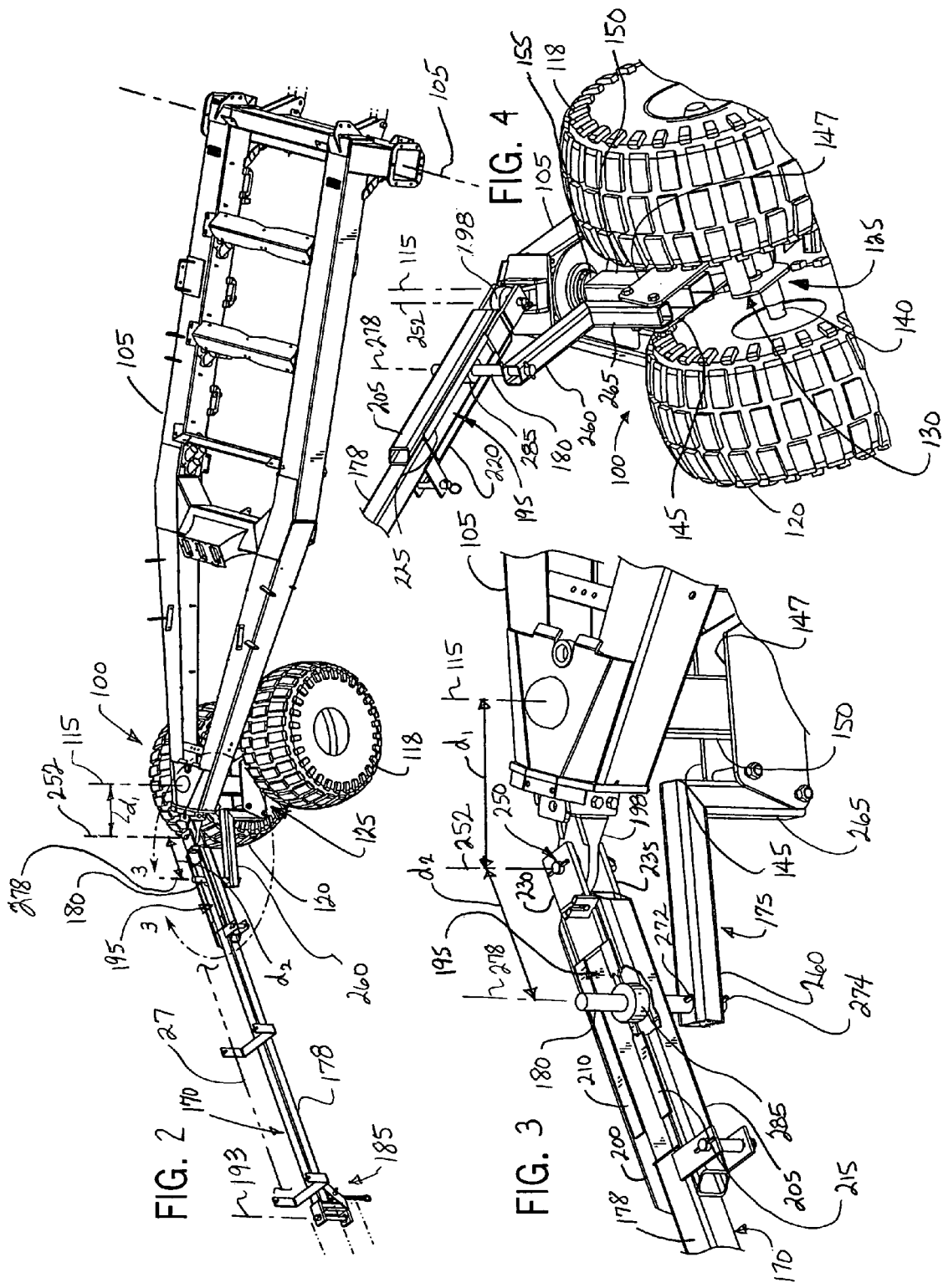

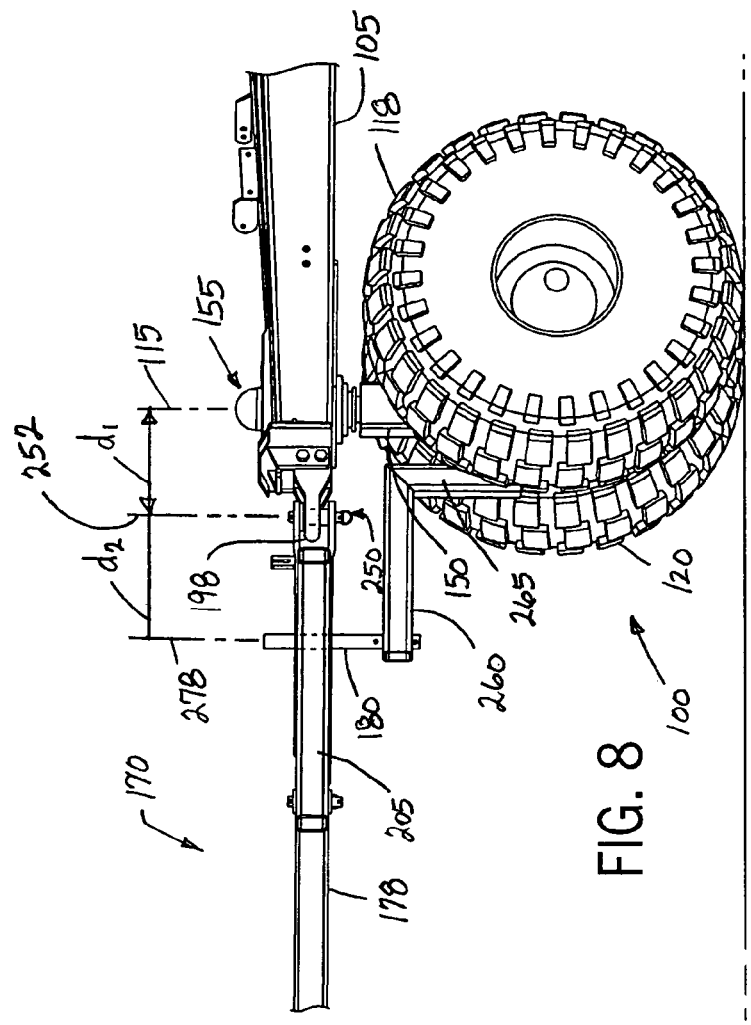
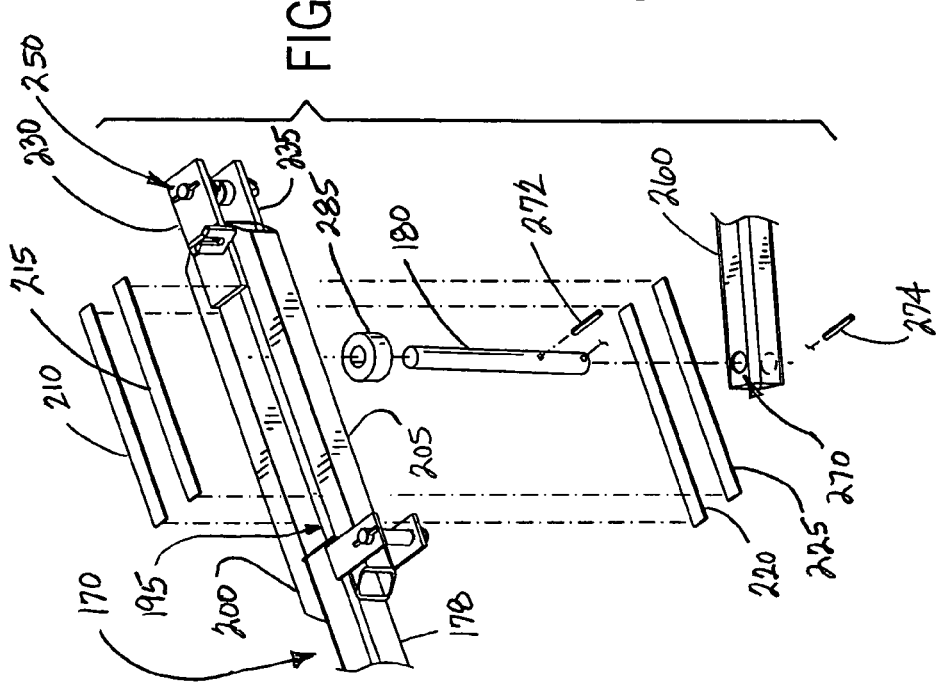

SLOW RESPONSE STEERING CONNECTION ASSEMBLY

FIELD OF THE INVENTION

The invention relates to a steering connection assembly for a vehicular train, and more specifically, relates to a steering connection assembly operable to provide enhanced maneuverability of a vehicular train that includes a seed cart and a distribution implement towed behind a prime mover.

BACKGROUND OF THE INVENTION

A vehicular train employing a series of trailers or implements towed behind a prime mover or tow vehicle is often used to even out or distribute heavy loads. In particular to agriculture, a tow vehicle, e.g., tractor, is known to be used to pull a storage cart towed behind a conventional distribution implement or drill unit for distributing fertilizer and/or seed in a field. The air cart is typically towed as a separate implement relative to the distribution implement because the excessive weight of the seed and/or fertilizer can adversely affect the planting depth. The air cart is often towed behind the distribution implement to avoid obscuring the field of vision of the operator in the tow vehicle. Rather than towing the distribution implement at the end of the vehicular train, the distribution implement is preferably pulled directly at the tow vehicle to enhance distribution of the product when turning a corner in the field.

However, the above-described agricultural implement train has several drawbacks. With the desire for increased distribution spread, the conventional distribution implement includes emerging type wings or booms that each can reach a length of 70 to 80-feet. When ready for transport, the conventional distribution implements retract the wings in a fold-back back manner, creating a long-trailing wing section. These long-trailing wing sections dictate a longer tow bar for the towed-behind air cart to provide clearance of the folded wing sections when the vehicular train maneuvers a corner during transport. In regard to field operation, operators desire the air cart to be as close as possible to the distribution implement so as to enhance delivery of product from the air cart to the distribution implement, and yet also desire a steering connection system that provides the air cart with sufficient clearance of the extended wing sections of the distribution implement.

Therefore, there is a need or desire for an enhanced steering connection assembly for a vehicular train that addresses the drawbacks described above. The steering connection assembly should also be configured to be utilized with a wide variety of implements or trailers towed behind a prime mover, in addition to those related to agriculture.

SUMMARY OF THE INVENTION

The present invention provides a connection assembly for and a method of steering a vehicular train that meets the desires and needs described above. The steering connection assembly of the present invention thus enhances the smooth maneuverability of operation of the vehicular train, in particular the operation of a towed distribution implement in the field and during transport.

In a first embodiment of the present invention, a steering connection assembly for a vehicle train having a first implement towed behind a second implement being towed behind a tow vehicle in a direction of travel is provided. The first implement includes a wheel assembly located at a forward end of a frame and supported to swivel about a first vertical axis defined by a vertical steering column, the vertical steering column located along a central longitudinal axis of the first implement. The steering connection assembly includes an elongated tow bar having a forward end opposite a rearward end relative to the direction of travel of the tow vehicle. The forward end of the tow bar is pivotally coupled to the second implement. The rearward end of the tow bar includes an elongated opening. The steering connection assembly also includes a steering arm having a forward end and rearward end. The rearward end of the steering arm is attached so that the steering arm moves with rotation of the wheel assembly about the first vertical axis defined by the vertical steering column of the first implement. The steering connection assembly further includes a steering rod member that extends vertically upward from the forward end of the steering arm and through the opening at the rearward end of the tow bar. The rearward end of the tow bar is pivotally coupled about a second vertical axis at the forward end of the frame of the first implement. The vertical steering rod member moves along the elongated opening through the tow bar with a first angle of rotation of the tow bar about the second vertical axis so as to cause a second angle of rotation of the steering arm member and attached wheel assembly about the first vertical axis. The second angle of rotation of the steering arm and attached wheel assembly is less than the first angle of rotation of the tow bar relative to the central longitudinal axis of the first implement.

The preferred tow bar includes a first and a second side retainer member in general parallel alignment to and attached at opposite sides of a main tow bar member. The first and second side retainer members define the elongated opening therebetween. The steering connection assembly further includes a pair of upper and lower retainer members. A first and a second upper retainer member are attached at an upper surface of the first and second side retainer members, respectively. A first and a second lower retainer member attached at a lower surface of the first and second side retainer members, respectively. The preferred steering connection assembly further includes an upper and lower tow coupling member. The upper tow coupling member is attached at an upper surface of the first and second side retainer members, and the lower tow coupling member is attached at the lower surface of the first and side retainer members. The upper and lower tow coupling members each include a generally flat plate structure having aligned holes extending therethrough to receive the vertical coupling pin that pivotally couples the rear end of the tow bar to a hitch member at the forward end of the frame of the first implement.

The preferred steering arm includes a horizontally aligned steering arm member aligned generally perpendicular to a vertically aligned steering arm member. The horizontally aligned steering arm member includes a forward end having an opening extending therethrough to receive the steering rod member. A pair of coupling pins are configured to hold a position of the steering rod member relative to the steering arm. The steering connection assembly further includes a guide member that is generally toroidal-shaped that defines a central opening to receive the steering rod member therethrough. The guide member is configured to move along the opening defined between the first and second side retainer members and the upper and lower retainer members, and to rotate about a vertical pivot axis defined by the steering rod member.

The preferred steering connection assembly further includes a pair of vertically aligned caster plate members attached at opposite sides of the vertical steering column of the wheel assembly of the first implement. The caster plate members are configured to receive the vertical steering arm member therebetween. A pair of generally horizontally aligned sleeves attached at the vertical steering arm member are configured to receive coupling pins attaching the vertical steering arm member between the pair of the vertically aligned caster plate members so that the steering arm member rotates with the castering wheel assembly at the front of the first implement.

In another embodiment, the present invention provides a steering connection assembly in combination with a vehicle train. The vehicle train comprises an air cart towed behind a distribution implement being towed behind a tow vehicle in a direction of travel. The air cart includes a frame in support of a supply of seed product, the frame having a forward end supported by a wheel assembly. The wheel assembly is operable to swivel or rotate about a first vertical axis defined by a vertical steering column located along a central longitudinal axis of the air cart frame. The air cart further includes a steering connection assembly coupling the air cart to be towed behind the distribution implement. The steering connection assembly includes an elongated tow bar having a forward end opposite a rearward end relative to the direction of travel of the tow vehicle. The forward end of the tow bar is coupled to pivot about a second vertical axis with respect to the distribution implement. The rearward end of the tow bar includes an elongated opening, and is pivotally coupled about a third vertical axis at the forward end of the frame of the air cart. The steering connection assembly further includes a steering arm having a forward end and rearward end. The rearward end of the steering arm is attached so that the steering arm moves with rotation of the wheel assembly about the first vertical axis defined by the vertical steering column of the first implement. The steering connection assembly also includes a steering rod member extending vertically upward from the forward end of the steering arm and extending through the elongated opening of the tow bar. The vertical steering rod member moves in a linear direction along the elongated opening through the tow bar with rotation of the tow bar about the second vertical axis so as to cause a second angle of rotation of the steering arm member and the attached wheel assembly about the first vertical axis so that the second angle of rotation of the steering arm and attached wheel assembly is less than the first angle of rotation of the tow bar relative to the central longitudinal axis of the first implement.

The present invention also provides a method of steering a first implement towed behind a second implement pulled by a tow vehicle in a direction of travel. The method comprises the steps of rotating the second implement about a pivot pin coupled to a forward end of a tow bar; rotating the tow bar a first rotational angle about a second pivot pin coupled to a forward end of a frame of the first implement relative to a central longitudinal axis of the first implement; moving a vertically aligned steering rod member in a linear direction along an elongated opening extending through the tow bar; and rotating a steering arm and an attached castering wheel assembly in support of the forward end of the first implement about a vertical axis defined by the castering wheel assembly in response to the step of moving the steering rod member along the elongated opening in the tow bar, such that the steering arm and attached castering wheel assembly rotate a second rotational angle relative to the central longitudinal axis of the first implement, the second rotational angle being less than the first rotational angle.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 2 shows a perspective view of the steering connection assembly in combination with the air cart in accordance with the present invention.

FIG. 3 illustrates a detailed perspective view of the steering connection system along line 3-3 shown in FIG. 2.

FIG. 4 illustrates a detailed upward perspective view of the steering connection assembly shown in FIG. 2.

FIG. 5 illustrates an exploded perspective view of the steering connection assembly in accordance with the present invention.

FIG. 8 shows a side elevation view of the steering connection assembly shown in FIG. 2.

DETAILED DESCRIPTION OF THE PREFERRED EMBODIMENTS

Figure 1:
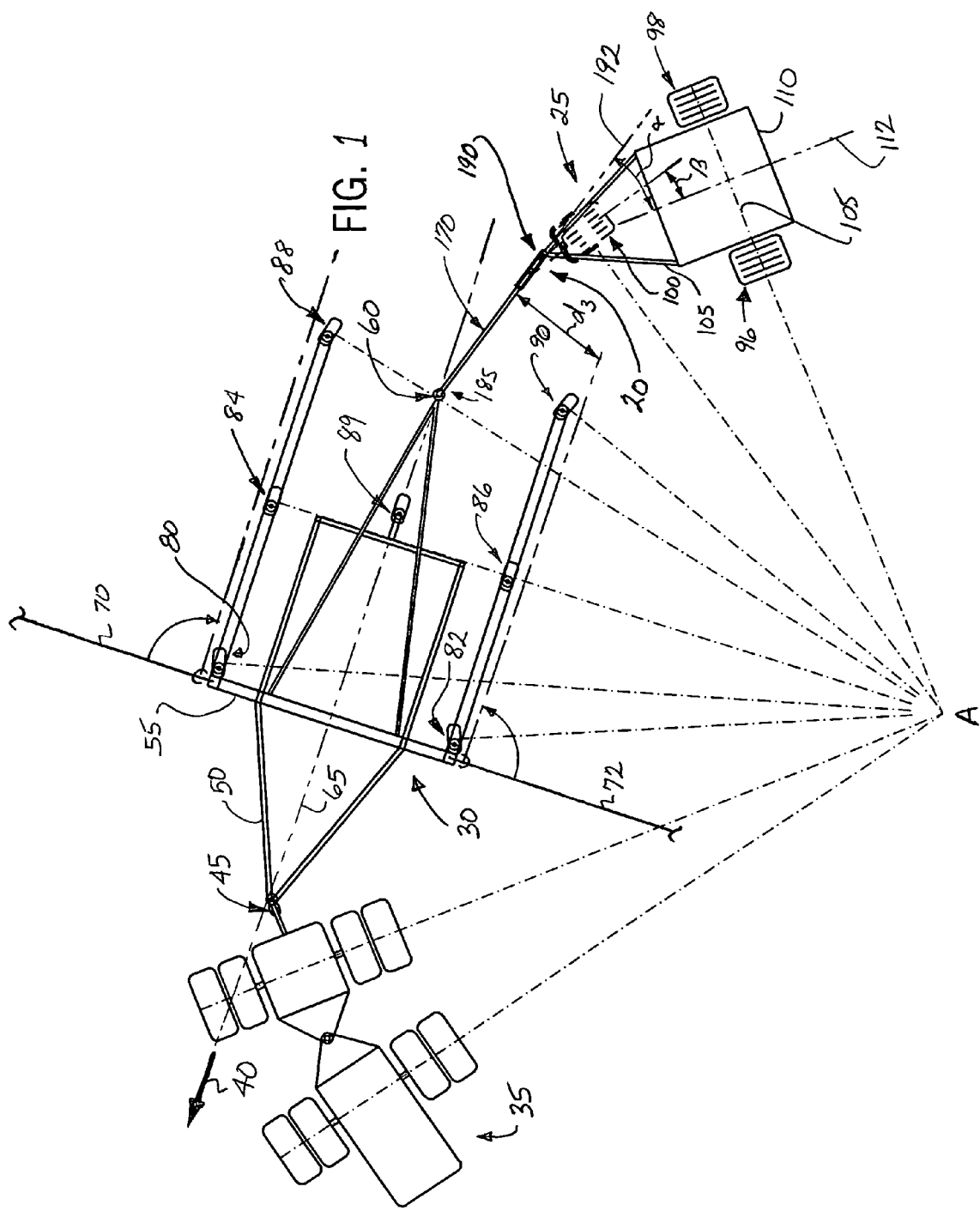
FIG. 1 illustrates a plan view of a vehicle train that includes a tow vehicle, a planting distribution implement and an air cart interconnected by a steering connection assembly in accordance with the present invention.

Referring to FIG. 1, a steering connection assembly 20 is illustrated for a vehicle train that includes a first implement 25 towed behind a second implement 30 being towed behind a tow vehicle 35 in a direction of travel 40. For a preferred vehicle train, the first implement 25 is an air cart configured to pneumatically convey a supply of product (e.g., seed, fertilizer, herbicide, pesticide, etc.) via a series of distribution lines 27, and the second implement 30 is a drill or other type of product distribution implement configured to distribute the supply of product received from the air cart 25 to the field. The preferred tow vehicle 35 is a tractor or prime mover having a tow hitch 45 configured to secure the second implement 35 to the rear of the tow vehicle 40.

Still referring to FIG. 1, the preferred drill implement 30 includes a tongue or connecting A-frame member 50 configured to couple a frame 55 of the drill implement 30 to the tow hitch 45 of the tow vehicle 35. The drill implement 30 further includes an implement hitch 60 generally located at the rear of the drill implement 30 and along a central longitudinal axis 65 of the drill implement 30. The drill implement 30 further includes wing sections 70 and 72 configured to move between an extended, operative position for operation in the field and a folded, inoperative position (shown in dashed line) for transport. The typical wing sections 70 and 72 each extend approximately 70-80 feet. The drill implement 30 further includes a series of wheel assemblies 80, 82, 84, 86, 88, 89 and 90 operable to moveably support the frame 55 and wing sections 70 and 72 of the drill implement 30. In a preferred embodiment, the series of wheel assemblies include a pair of forward wheel assemblies 80 and 82, middle section wheel assemblies 84 and 86, and rear wheel assemblies 88, 89 and 90. The forward and rear wheel assemblies 80, 82, 88, 89 and 90 each are preferably caster type wheel assemblies configured to caster or pivot about a vertical axis. The middle section wheel assemblies 84 and 86 are generally fixed in parallel alignment with the central longitudinal axis 65 and do not pivot. The drill implement 30 is pulled directly by the tow vehicle 35. The implement hitch 60 at the rear of the drill implement 30 pulls the air cart 25. This is a common configuration that provides an operator at the tow vehicle 35 with good visibility and the most control over the drill implement 30, e.g., working around obstructions or going into a tight corner, in the folded, inoperative position where the wings 70 and 72 are folded back in the rearward direction such that they are positioned generally parallel with the longitudinal axis 65 of the drill implement 30.

As illustrated in FIGS. 1 and 2, the air cart 25 generally includes a series of wheel assemblies 96, 98 and 100 in support of a frame 105 and a bulk tank 110 that define a central longitudinal axis 112. The preferred wheel assemblies 96, 98 and 100 are floatation-type, over-sized wheel assemblies. The wheel assemblies 96 and 98 are supported on a common axle or shaft 105 (shown in dashed line in FIG. 2). The forward wheel assembly 100 is located at the forward end of the frame 105. The forward wheel assembly 100 is preferably a caster-type wheel assembly configured to caster or pivot about a vertical axis 115.

Figure 6:
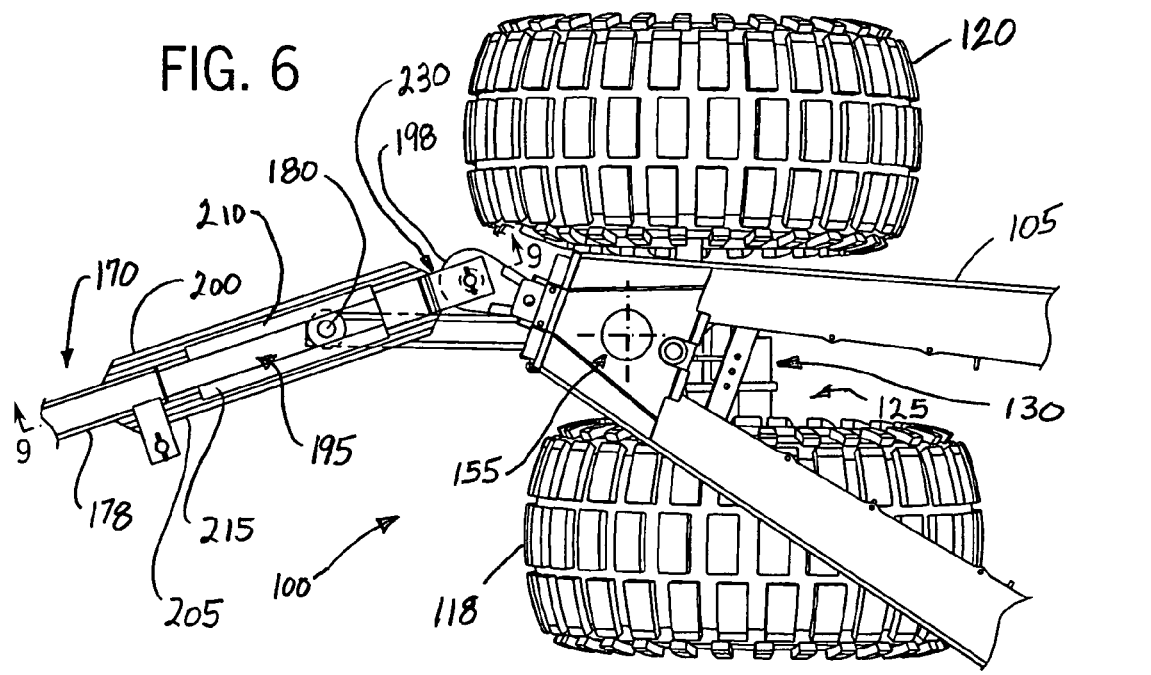
FIG. 6 illustrates a detailed top plan view of the steering connection assembly shown in FIG. 2.
Figure 7:
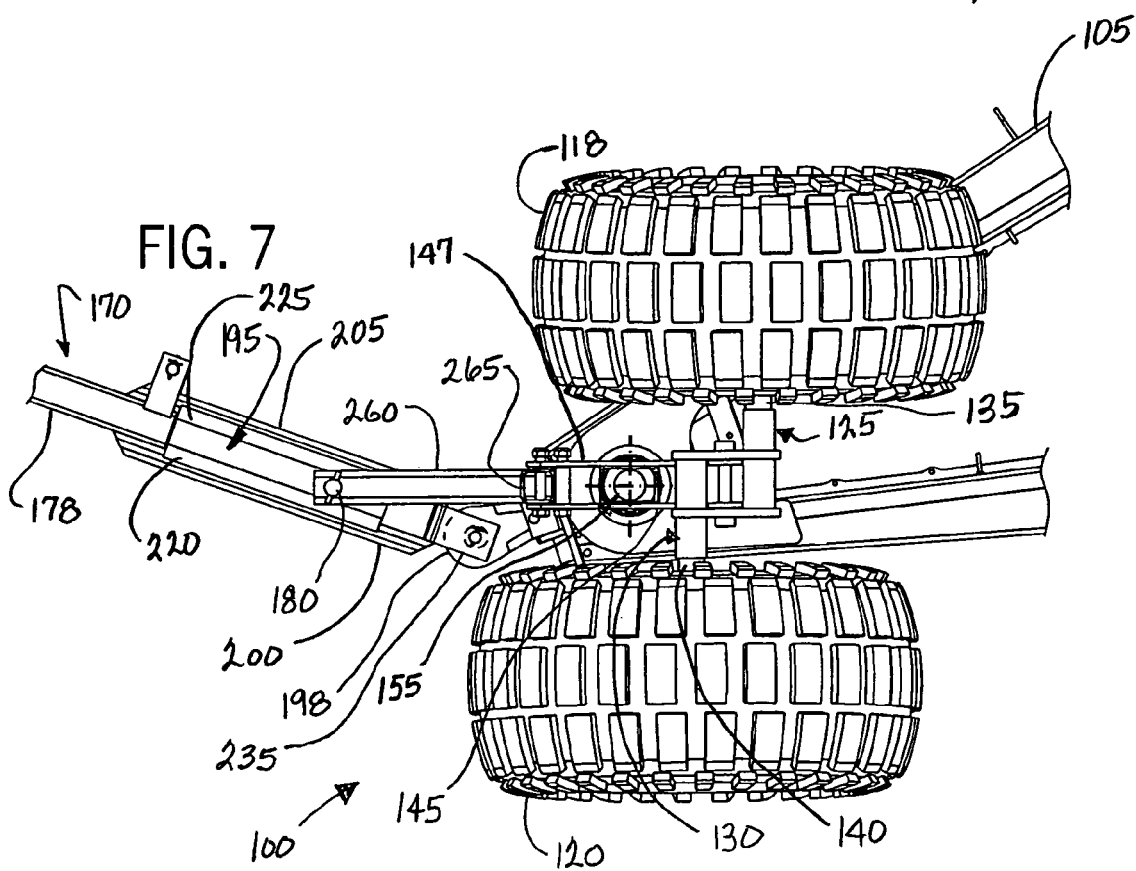
FIG. 7 shows a detailed bottom plan view of the steering connection assembly shown in FIG. 2.

Referring now to FIGS. 2, 4 and 6-7, the preferred forward wheel assembly 100 includes a first floatation tire 118 and a second floatation tire 120 supported in a walking beam arrangement 125 in a manner known in the art to provide for leveling of the air cart 25 as it travels over rough terrain in the field. Referring specifically to FIGS. 4, 6 and 7, the walking beam arrangement 125 generally includes a dual caster mount member 130 in support of a first axle 135 of the first tire 118 spaced a distance from a second axle 140 in support of a second tire 140. A pair of caster support plate members 145 and 147 interconnect the dual caster mount 130 to a vertical caster steering column member 150 (See FIG. 4). The vertical caster steering column member 150 is received between the pair of caster support plate members 145 and 147. The vertical caster steering column member 150 defines a cavity (not shown) therein to receive a kingpin member 155. The kingpin member 155 includes a generally cylindrical portion extending in a vertical direction that defines the vertical axis 115 about which the front wheel assembly 100 casters or pivots relative to the frame 105.

Referring now to FIG. 1, the steering connection assembly 20 in accordance with the present invention generally interconnects the hitch 60 at the rear end of the drill implement 30 to the frame 105 of the air cart 25 in a manner that causes a slow steering response and sufficient clearance of the air cart 25 relative to the drill implement 30. As shown in FIG. 3, the preferred steering connection assembly 20 includes an elongated tow bar 170, a steering arm 175, and a steering rod member 180.

As illustrated in FIG. 1, the elongated tow bar 170 includes a main tow bar member 178 comprised of square-shaped structural tubular member. The tow bar 170 generally has a forward end 185 opposite a rearward end 190, relative to the forward direction of travel 40 of the tow vehicle 35, that defines a central longitudinal axis 192. Referring now to FIG. 2, the forward end 185 of the tow bar 170 is coupled to pivot about a vertical axis 193 at the implement hitch 60 of the drill implement 30 (FIG. 1). The tow bar 170 includes an elongated opening 195 generally located at the rearward end 190 of the tow bar 170 and generally extending along the central longitudinal axis 192. The rearward end 190 of the tow bar 170 is pivotally coupled at an implement hitch 198 of the air cart 25.

Now referring to FIGS. 3 and 5, the preferred tow bar 170 further includes first and second side retainer members 200 and 205 aligned generally parallel to and attached at opposite sides of the main tow bar member 178. The first and second retainer members 200 and 205 are located to generally define the elongated opening 195 therebetween. The preferred first and second side retainer members 200 and 205 are comprised of square-shaped structural tubular members, yet the type of structural members (e.g., solid, circular, etc.) can vary and is not limiting on the invention.

Figure 10:
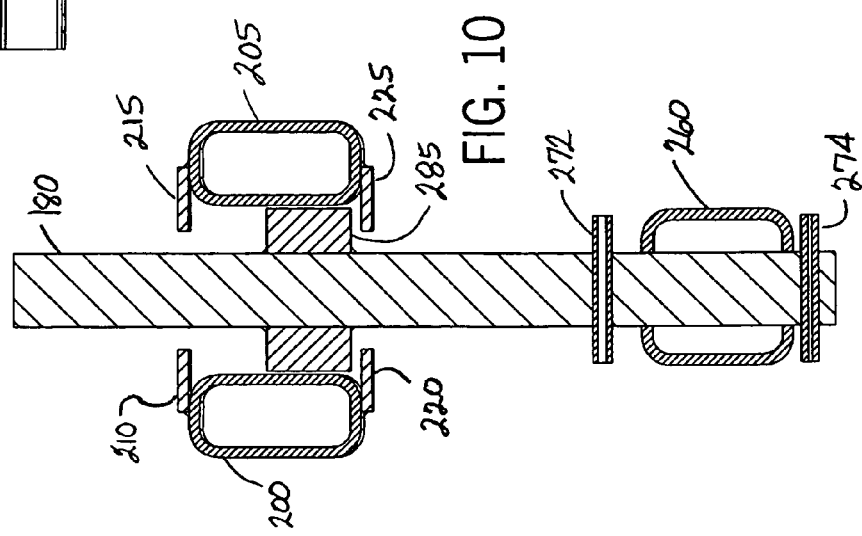
FIG. 10 shows a detailed cross-section view of the steering connection assembly along line 10-10 in FIG. 9.

As shown in FIGS. 5 and 10, the first and second upper retainer members 210 and 215 are attached at an upper surface of the first and second side retainer members 200 and 205, respectively. The first and second low retainer members 220 and 225 are attached at a lower surface of the first and second side retainer members 200 and 205, respectively, opposite the first and second upper retainer members 210 and 215. The upper and lower retainer members 210, 215, 220 and 225 further define the elongated opening 195 between the first and second side retainer members 200 and 205.

Figure 9:
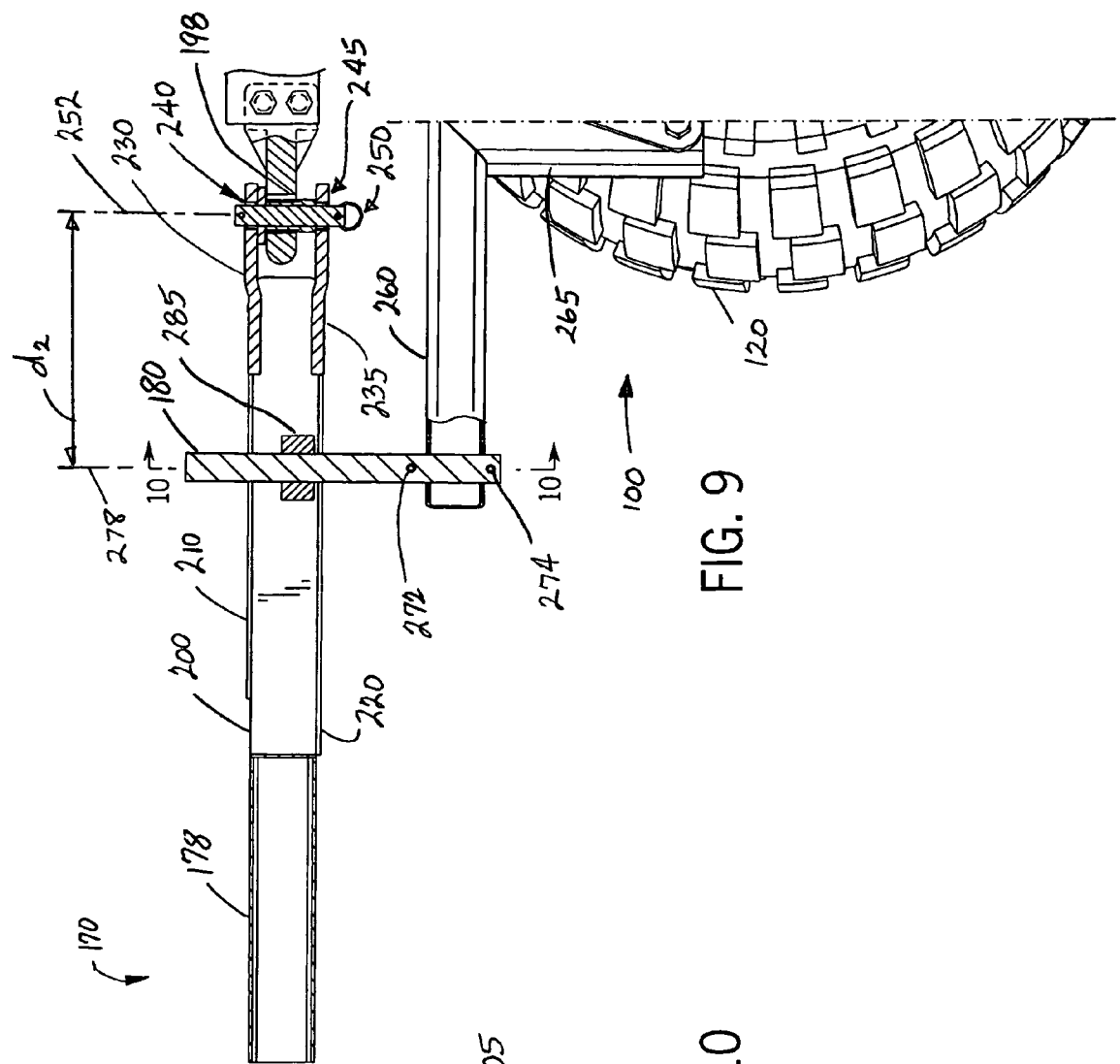
FIG. 9 shows a detailed cross-section view of the steering connection assembly along line 9-9 in FIG. 8.

Referring now to FIGS. 5 and 9, upper and lower tow coupling members 230 and 235 are attached at the rear end of the first and second side retainer members 200 and 205. The upper tow coupling member 230 is attached at an upper surface of both the first and second side retainer members 200 and 205, and the lower tow coupling 235 is attached at the lower surface of both the first and second side retainer members 200 and 205. The preferred upper and lower tow coupling members 230 and 235 are comprised of a generally flat plate structure, each having a hole or opening 240, 245 extending therethrough and aligned relative to the other so as to receive a vertically aligned coupling pin 250 defining a vertical axis 252 configured to interconnect the steering connection assembly 20 to the implement hitch 198 at the forward end of the frame 105 of the air cart 25. The upper and lower tow coupling members 230 and 235 generally define the rearward end of the elongated opening 195 (FIG. 5). The upper and lower tow coupling members 230 and 235 are preferably attached to the first and second side retainer members 200 and 205 via a weld, bolt, or similar fixed attachment means.

As illustrated in FIGS. 3-4 and 8-9, the steering arm 175 generally interconnects the tow bar 170 with the front wheel assembly 100 of the air cart 25. The steering arm 175 includes a generally horizontally aligned steering arm member 260 aligned generally perpendicular to a vertically aligned steering arm member 265. The horizontally aligned steering arm member 260 includes a forward end having an opening 270 extending therethrough to receive the steering rod member 180 in a generally vertically upward aligned manner. A pair of coupling pins 272, 274 (See FIGS. 3, 9 and 10) are configured to hold a position of the steering rod member 180 relative to the steering arm 175. The steering rod member 180 is attached so that the steering arm is operable to rotate about a vertical axis 278 defined by the steering rod member 180.

As shown in FIGS. 3, 9 and 10, a guide member 285 is mounted on the steering rod member 180 and disposed to move within the elongated opening 195. The preferred guide member 285 is generally cylindrical-shaped or toroidal-shaped and includes a central opening 290 configured to receive the steering rod member 180 therethrough. It should be understood to one skilled in the art that the shape of the guide member 285 can vary (e.g., cylindrical shaped, toroidal shaped, square shaped, etc.) and is not limiting on the invention.

Having described the general structure of the steering connection assembly 20 of the invention, the following is a general description of the operation of the steering connection assembly 20 in combination with the vehicle train 25, 30 and 35 in the field.

FIG. 1 illustrates a top view of the air cart 25, the drill implement 30, and the tow vehicle 35 as the vehicle train corners or turns about a reference point A. Reference lines 300 illustrate the radius concentric relative to the horizontally aligned axes of rotation of each of the wheel assemblies 80, 82, 84, 86, 88, 89, 90, 96, 98 and 100, respectively, of the vehicle train about or through the reference point A. The radius of cornering about point A is set by the degree of steering of the tow vehicle 35, the fixed wheel assemblies 84, 86 on the drill implement 30, the forward wheel assembly 100 at the air cart 25, and the wheel assemblies 96, 98 at the rear axle 105 of the air cart 25. All these wheel assemblies 84, 86, 96, 98 and 100 comply to corner the vehicle train about the reference point A. The vertical pivot axis 115 of the forward wheel assembly 100 of the air cart 25 is spaced some distance ($d_1$) rearward from the vertical pivot axis 252 of attachment of the air cart 25 to the tow bar 170 at the implement hitch 198. The steering arm 175 extends forward and includes a steering rod member 180 and guide member 265 which travels along the elongated opening 195 at the tow bar 170. When the tow bar 170 rotates about a vertical axis 300 (See FIG. 2) defined by the implement hitch 60 of the drill implement 30 as the vehicle train corners about reference point A, the steering rod member 180 restrained in the elongated opening 195 causes the forward wheel assembly 100 and the frame 105 of the air cart 25 to rotate about the vertical axis 115. Due to the relative difference in distance ($d_1$) between the vertical axes 115 and 252 and the distance ($d_2$) between the vertical axes 252 and 278 as shown in FIGS. 2 and 3, the forward wheel assembly 100 and the frame 105 rotate an angle ($\beta$) that is approximate one-half as much as the angle ($\alpha$) of rotation of the tow bar 170 relative to the central longitudinal axis 112 of the frame 105 of the air cart 25, as shown in FIG. 1. This ratio of the rotation angles ($\beta$) relative to ($\alpha$) can be tailored to a greater or lesser amount by modifying the relative distance ($d_1$) between the vertical axes 115 and 252 and the distance ($d_2$) between the axes 252 and 278 to achieve the desired turn response rate. In addition to enhancing turning response rate, the steering connection assembly 20 also enhances a separation distance ($d_3$) between the trailing wing sections 70 and 72 of the drill implement 30 and the tow bar member 170. Thereby, the vehicle train can perform a sharper cornering radius without the tow bar member 170 or the air cart 25 contacting either of the wing sections 70 and 72 of the drill implement 30. Also, the implement hitch 60 of the drill implement 30 experiences less or reduced side loading forces due to the decrease of the angle ($\beta$) between the forward wheel assembly 100 and the central longitudinal axis 112 of the air cart 25. Furthermore, the front wheel assembly 100 of the air cart 25 is slower to respond to cornering by the tow vehicle 35, such that reversing or backing up the drill implement 30 and air cart 25 can be more readily performed with the tow vehicle 35 because the operator has more time to respond as well as to make counter-steering corrections. Also, the air cart 25 will more closely follow the drill implement 30 and the tow vehicle 35 and thereby is less prone to cut across corners, ditches, and gate posts.

A wide variety of implements could employ the steering connection assembly 20 constructed in accordance with the invention. Thus, while the invention is disclosed with reference to an air cart 25 towed behind an agricultural planter implement 30 and tow vehicle 35, the invention is not so limited. One skilled in the art will recognize that the steering connection assembly 20 of the present invention can be employed to tow various types of towed implements and is not limiting on the invention.

Many changes and modifications could be made to the invention without departing from the spirit thereof. The scope of these changes will become apparent from the appended claims.

I claim:

1. A steering connection assembly for a vehicle train that includes a first implement towed behind a second implement being towed behind a tow vehicle in a direction of travel, the first implement including a wheel assembly located at a forward end of a frame and supported to swivel about a first vertical axis defined by a vertical steering column located along a central longitudinal axis of the first implement, the steering connection assembly comprising:

an elongated tow bar having a forward end opposite a rearward end, the forward end pivotally coupled to the second implement, the rearward end including an elongated opening extending along a length of the tow bar, the rearward end of the tow bar being pivotally coupled to rotate about a second vertical axis at the forward end of the frame of the first implement;

a first and a second side retainer member in general parallel to and attached at opposite sides of the elongated tow bar, the first and second retainer members defining the elongated opening therebetween, the first and second retainer members each including a rearward end relative to the direction of travel;

a steering arm includes a generally horizontally aligned steering arm member aligned generally perpendicular to a vertically aligned steering arm member;

the horizontally aligned steering member includes a forward end having an opening extending therethrough to receive a steering rod member relative to the steering arm; and the steering rod member is attached so that the steering arm is operable to rotate with rotation of the wheel assembly of the first implement about the first vertical axis defined by the steering rod member;

wherein a second angle of rotation of the steering arm and attached wheel assembly about the second vertical axis is less than the first angle of rotation of the tow bar about the first vertical axis relative to the central longitudinal axis of the first implement.

2. The steering connection assembly of claim 1, further comprising:

the first and second upper retainer member attached at an upper surface of the first and second side retainer members, respectively, and a first and second lower retainer member attached at a lower surface of the first and second side retainer members, respectively.

3. The steering connection assembly of claim 1, further comprising:

an upper and lower tow coupling member, the upper tow coupling member attached at an upper surface of the first and second side retainer members and the lower tow coupling member attached at the lower surface of the first and side retainer members, the upper and lower tow coupling members each including a generally flat plate structure having a hole extending therethrough to receive a vertical coupling pin.

4. The steering connection assembly of claim 1, wherein a vertically aligned hitch coupling pin pivotally couples the rearward end of the tow bar to a hitch member at the forward end of the first implement.

5. The steering connection assembly of claim 1, the first angle of rotation of the tow bar about the first vertical axis causes the vertical steering rod member to move in a linear direction along the elongated opening through the tow bar.

6. The steering connection assembly of claim 1, wherein a guide member that is generally toroidal-shaped and defining a central opening therethrough to receive the steering rod member therethrough, the guide member configured to move along the slot defined by the first and second side retainer members and an upper and lower retainer members, wherein the guide member is configured to rotate about the vertical pivot axis defined by the steering rod member.

7. The steering connection assembly of claim 1, wherein a pair of vertically aligned caster plate members attached at opposite sides of a vertical steering column of the wheel assembly, the pair of caster plate members configured to receive the vertical aligned steering arm member therebetween.

8. The steering connection assembly of claim 7, wherein a pair of generally horizontally aligned sleeves attached at the vertically aligned steering arm member configured to receive coupling pins attaching the vertically aligned steering arm member between the pair of the vertically aligned caster plate members so that the steering arm member rotates with the wheel assembly.

9. A steering connection assembly in combination with a vehicle train, the vehicle train comprising an air cart towed behind a drill distribution implement being towed behind a tow vehicle in a direction of travel, the air cart comprising:
   a frame in support of a container of seed, the frame having a forward end relative to a forward direction of travel of the vehicle train; and
   a wheel assembly located at the forward end of the frame, the wheel assembly operable to swivel about a first vertical axis defined by a vertical steering column located along a central longitudinal axis of the air cart, wherein the steering connection assembly couples the air cart to the drill distribution implement, the steering connection assembly comprising:
      a tow bar having a forward end opposite a rearward end relative to the direction of travel of the tow vehicle, the forward end pivotally coupled at the drill distribution implement so as to rotate about a second vertical axis with respect to the drill distribution implement, the rearward end including an elongated opening extending along a length of the tow bar and pivotally coupled to rotate about a third vertical axis at the forward end of the frame of the air cart;
      a first and a second side retainer member in general parallel to and attached at opposite sides of the tow bar, the first and second retainer members defining a slot therebetween, the first and second retainer members each including a rearward end relative to the direction to travel;
   a steering arm includes a generally horizontally aligned steering arm member aligned generally perpendicular to a vertically aligned steering arm member;
   the horizontally aligned steering member includes a forward end having an opening extending therethrough to receive a steering rod member relative to the steering arm; and
   the steering rod member extending vertically from the forward end of the horizontally aligned steering member and through the opening at the rearward end of the tow bar,
   wherein the vertical steering rod member moves relative to the opening through the draw bar with rotation of the tow bar so as to cause the a second rotation of the steering arm and attached wheel assembly, and wherein the second rotation of the steering arm and attached wheel assembly is less than the first rotation of the tow bar relative to the central longitudinal axis of the air cart.

10. The combination of claim 9, further comprising:
   the first and second upper retainer member attached at an upper surface of the first and second side retainer members, respectively, and a first and second lower retainer member attached at a lower surface of the first and second side retainer members, respectively.

11. The combination of claim 9, further comprising:
   an upper and lower tow coupling member, the upper tow coupling member attached at an upper surface of the first and second side retainer members and the lower tow coupling member attached at the lower surface of the first and side retainer members, the upper and lower tow coupling members each including a generally flat plate structure having a hole extending therethrough aligned with one another so as to receive the vertical coupling pin.

12. The combination of claim 9, wherein a vertically aligned hitch coupling pin pivotally coupling the rearward end of the tow bar to a hitch member at the forward end of the air cart.

13. The combination of claim 9, further comprising:
   a pair of coupling pins configured to hold a position of the steering rod member relative to the steering arm.

14. The combination of claim 9, wherein a guide member that is generally cylindrical-shaped or toroidal-shaped and defining a central opening to receive the steering rod member therethrough, the guide member configured to move along the slot defined by the first and second side retainer members and the upper and lower retainer members, wherein the guide member is configured to rotate about the vertical pivot axis defined by the steering rod member.

15. The combination of claim 9, wherein a pair of vertically aligned caster plate members attached at opposite sides of a vertical steering column of the wheel assembly, the pair of caster plate members configured to receive the vertical steering arm member therebetween.

16. The combination of claim 9, wherein a pair of generally horizontally aligned sleeves attached at the vertical steering arm member configured to receive coupling pins attaching the vertical aligned steering arm member between the pair of the vertically aligned caster plate members so that the steering arm member rotates with the wheel assembly.

* * * * *